United States Patent
Panwar

(10) Patent No.: US 12,277,155 B2
(45) Date of Patent: Apr. 15, 2025

(54) EXPLORATION OF RELEVANT INFORMATION FOR AUTOMATED WORKFLOWS

(71) Applicant: Yashraj Panwar, Mountain View, CA (US)

(72) Inventor: Yashraj Panwar, Mountain View, CA (US)

(*) Notice: Subject to any disclaimer, the term of this patent is extended or adjusted under 35 U.S.C. 154(b) by 0 days.

(21) Appl. No.: 18/957,623

(22) Filed: Nov. 22, 2024

(65) Prior Publication Data

US 2025/0086214 A1    Mar. 13, 2025

Related U.S. Application Data

(60) Provisional application No. 63/720,759, filed on Nov. 15, 2024, provisional application No. 63/712,512, filed on Oct. 27, 2024.

(51) Int. Cl.
    *G06F 16/334*   (2025.01)
    *G06F 16/31*    (2019.01)
    *G06F 16/332*   (2019.01)

(52) U.S. Cl.
    CPC ........ *G06F 16/3344* (2019.01); *G06F 16/322* (2019.01); *G06F 16/3326* (2019.01)

(58) Field of Classification Search
    CPC . G06F 16/3344; G06F 16/322; G06F 16/3326
    See application file for complete search history.

(56) References Cited

U.S. PATENT DOCUMENTS

| | | | | |
|---|---|---|---|---|
| 11,816,136 | B2* | 11/2023 | Wu | G06N 3/04 |
| 2016/0306791 | A1* | 10/2016 | Allen | G06F 16/3329 |
| 2018/0011927 | A1* | 1/2018 | Lee | G06F 16/3329 |
| 2018/0365220 | A1* | 12/2018 | Chakraborty | G06F 40/30 |
| 2020/0134032 | A1* | 4/2020 | Lin | G06F 16/2456 |
| 2022/0382770 | A1* | 12/2022 | Zhang | G06F 16/2465 |
| 2024/0249113 | A1* | 7/2024 | Liu | G06F 16/3329 |
| 2024/0386044 | A1* | 11/2024 | Ojha | G06F 16/353 |

\* cited by examiner

*Primary Examiner* — Abul K Azad

(57) ABSTRACT

An online system extracts information from a user for use in workflows using a machine learning-based language mode. The online system creates a weighted epoch tree comprising epoch nodes, each epoch node associated with a time interval associated with the user. An epoch node has a relevance score determined based on a set of events associated with the user that occurred during a time interval. The online system builds the weighted epoch tree by selecting an epoch node for further exploration based on relevance scores and determining a question relevant to a context represented by the selected epoch node. The online system determines an answer to the question and either adds the answer to an existing node or to new epoch nodes added to the weighted epoch tree. The online system may use the weighted epoch tree for generating a synthetic statement for the user.

20 Claims, 13 Drawing Sheets

EXPLORATION OF RELEVANT INFORMATION FOR AUTOMATED WORKFLOWS

CROSS-REFERENCE TO RELATED APPLICATIONS

This application claims the benefit of U.S. Provisional Application No. 63/712,512, filed on Oct. 27, 2024, and U.S. Provisional Application No. 63/720,759, filed on Nov. 15, 2024, each of which is incorporated by reference herein in its entirety.

FIELD OF ART

This invention relates generally to artificial intelligence in general, and more particularly to exploration of relevant user information for use in artificial intelligence based automated workflows.

BACKGROUND

Artificial intelligence techniques are used for automated workflows related to users, for example, workflows that require web-based form-filling. Certain user information relevant to such workflows is simple, for example, date of birth or name and is based on structured data types such as integers, float, dates, and so on. Processing such information as well as acquiring such information can be performed using well known techniques. However, certain types of information is represented using natural language and may require multiple iterations and complex interactions with the user. Conventional techniques are unable to acquire such information and often rely on the judgment of users to answer complex questions resulting in answers that may be incomplete or inadequate. Incomplete information provided to such workflows results in incorrect decisions made at various points resulting in incorrect or poor-quality results. As a result, conventional techniques are inadequate for extracting user information relevant to complex workflows.

SUMMARY

An online system extracts information for generating a synthetic statement for a user using a machine learning-based language mode. The online system determines a total time interval associated with a user for exploration of information describing the user. The online system creates a root epoch node for building a weighted epoch tree comprising epoch nodes. Each epoch node is associated with a time interval associated with the user. An epoch node has a relevance score determined based on a set of events associated with the user that occurred during the time interval of the epoch node. The online system builds the weighted epoch tree based on information describing the user, by performing the following steps. The online system selects an epoch node of the weighted epoch tree for further exploration based on relevance scores of epoch nodes of the weighted epoch tree. The online system determines a natural language question relevant to a context represented by the selected epoch node. The online system determines a natural language answer to the natural language question. The online system determines using a machine learning-based language model, whether to create child epoch nodes for the selected epoch node based on the natural language answer. Responsive to determining to create child epoch nodes, the online system divides the time interval of the epoch node into sub-intervals based on the natural language answer and creating a child epoch node for each sub-interval. The online system traverses the weighted epoch tree for generating a synthetic statement for the user.

According to an embodiment, the online system stores a set of natural language questions in a vector database. The online system determines a natural language question relevant to the context represented by the selected epoch node by generating a natural language description of the context represented by the selected epoch node and selecting one or more natural language questions from the vector database based on a vector distance between a vector representation of the natural language description of the context and vector representations of natural language questions stored in the vector database.

According to an embodiment, the online system determines whether to create child epoch nodes for the selected epoch node based on the natural language answer by performing the following steps. The online system generates a prompt for a machine learning-based language model, specifying the natural language answer and requesting the machine learning-based language model to determine whether the natural language answer comprises a plurality of epochs. The online system sends the prompt for execution to the machine learning-based language model and receives a response based on the execution of the machine learning-based language model. If the response indicates that there are multiple epochs within the time interval represented by the selected epoch node, determines to create child epoch nodes for the selected epoch node.

According to an embodiment, the online system selects an epoch node of the weighted epoch tree for further exploration based on relevance scores of epoch nodes of the weighted epoch tree by performing the following steps. The online system traverses the weighted epoch tree to identify a leaf epoch node having a highest relevance score compared to other leaf epoch nodes of the weighted epoch tree and provides the identified epoch node as the selected epoch node.

According to an embodiment, the online system determines the natural language answer to the natural language question by sending the natural language question for display via a client device and receiving, via the client device, the natural language answer to the natural language question.

According to an embodiment, the online system builds the weighted epoch tree by performing the following steps. Responsive to determining not to create child epoch nodes, the online system generates one or more natural language questions for extracting events associated with the user within the time interval of the epoch node. The online system adds information to the epoch node based on natural language answers corresponding to the natural language questions.

According to an embodiment, the online system further performs the following steps for a particular epoch node of the weighted epoch tree. The online system stores an attribute representing user provided information as received from the user. The online system generates a summary of the user provided information by generating a prompt for the machine learning-based language model that specifies the user provided information and requests the machine learning-based language model to generate a summary having less than a threshold size. The online system sends the prompt for execution to the machine learning-based language model and extracting the summary for the epoch node from a response received by executing the machine learning-based language model.

According to an embodiment, the online system generates a summary of a user provided description for a particular epoch node of the weighted epoch tree having a plurality of child epoch nodes as follows. The online system generates a prompt for the machine learning-based language model, specifying the summary of each of the child epoch nodes and requesting the machine learning-based language model to generate a summary having less than a threshold size. The online system sends the prompt for execution to the machine learning-based language model and extracts the summary for the epoch node from a response received by executing the machine learning-based language model.

Embodiments comprise non-transitory computer readable storage medium, storing instructions that when executed by one or more computer processors cause the one or more computer processors to perform steps of the methods disclosed herein.

Embodiments comprise computer systems including one or more computer processors, and a non-transitory computer readable storage medium, storing instructions that when executed by the one or more computer processors cause the one or more computer processors to perform steps of the methods disclosed herein.

Embodiments comprise non-transitory computer readable storage medium, storing instructions that when executed by one or more computer processors cause the one or more computer processors to perform steps of the methods disclosed herein.

Embodiments comprise computer systems including one or more computer processors, and a non-transitory computer readable storage medium, storing instructions that when executed by the one or more computer processors cause the one or more computer processors to perform steps of the methods disclosed herein.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The system according to an embodiment generates synthetic statements based on information describing a user. The system performs an exploration phase in which the system builds one or more weighted epoch trees that are used for exploring information relevant to a domain specific application. The system uses the information obtained by the exploration for automated workflows. For example, in an embodiment, the system traverses the weighted epoch trees to identify information relevant to various sections of a synthetic statement being generated for the user. The system may provide the relevant information to a machine learning-based language model, for example, a large language model to generate sections of the synthetic statement.

System Environment

Figure 1A:
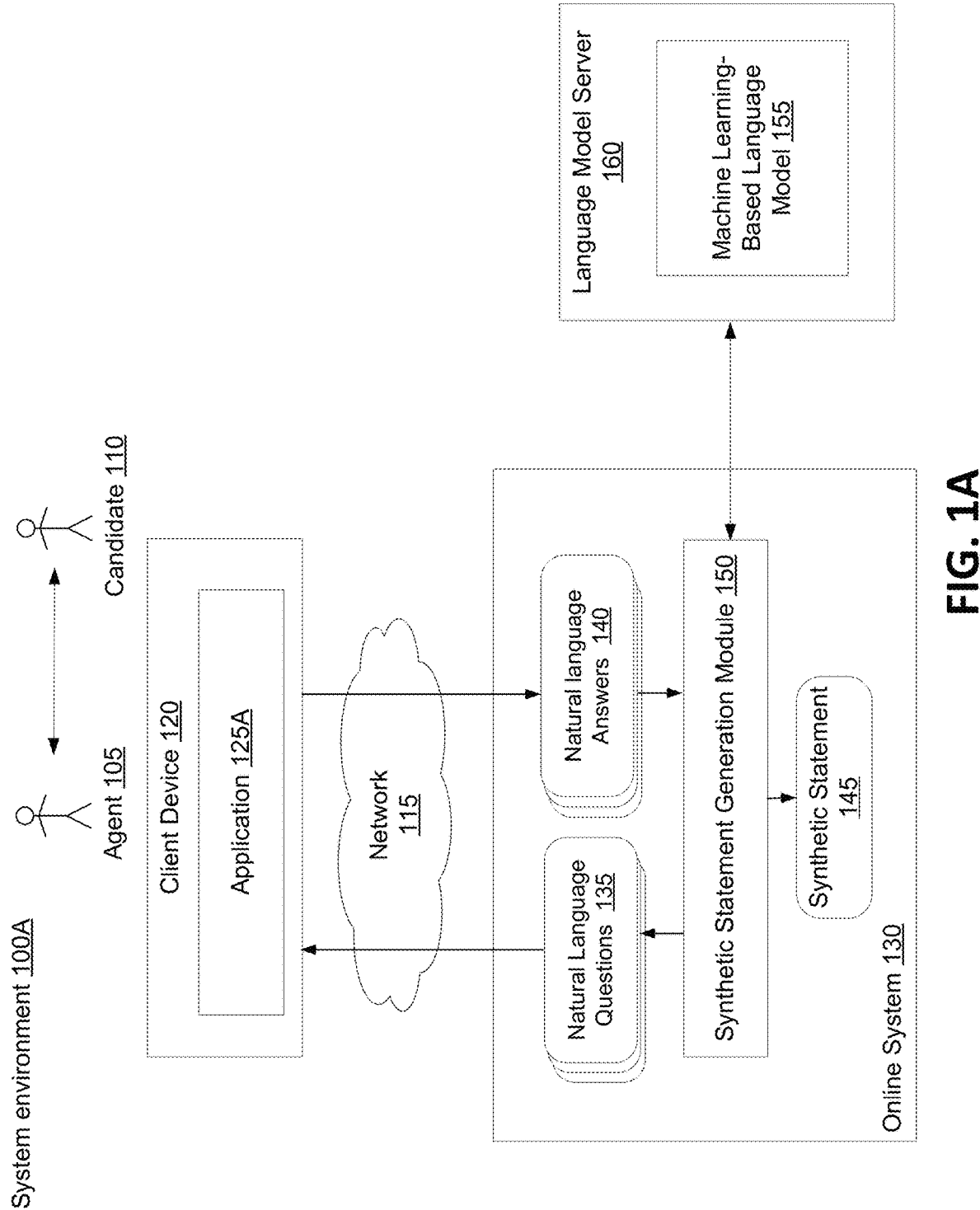
FIG. 1A is a high-level block diagram of a system environment for generation of synthetic statement for a user based on a machine learning-based language model, in accordance with an embodiment.

FIG. 1A is a high-level block diagram of a system environment for generation of synthetic statement for a user based on a machine learning-based language model, in accordance with an embodiment. The system environment 100A shown by FIG. 1 includes one or more client devices 120, a network 115, an online system 130, and a language model server 160. The system environment 100A allows an agent 105 to use a client device 120 to interact with the online system 130 to identify relevant questions for generating a synthetic statement based on information describing the candidate 110. The agents 105 may interact with the candidate 110 to obtain answers to the questions received from the online system 130. The agent 105 provides answers to the question received from the candidate 110 to the online system 130 via the client device 120, allowing the online system 130 to generate a synthetic statement for the candidate 110. In alternative embodiments, the candidate 110 may directly interact with the online system 130 via the client device to view questions and provide answers. In development environments, the client device 120 may be replaced by a process that simulates the agent 105 and or the candidate 110 to receive questions and provide answers to the online system 130. In alternative configurations, different and/or additional components may be included in the system environment 100A.

The client device 120 can be a personal or mobile computing device, such as a smartphone, a tablet, a laptop computer, or desktop computer. In some embodiments, the client device executes a client application 125A that uses an application programming interface (API) to interact with the online system 130. The client application 125A can be an internet browser, for example, internet explorer, Firefox, or Safari. The client device 120 is used by a user that could be an agent 105 talking to a candidate 110 or candidate 110. The agent 105 is an expert in the application 125 of the online system 130. The candidate 110 may or may not be an expert in the application 125 of the online system 130. The application interacts with the online system. The agent 105 interacts by taking natural language questions 135 and retrieving information from candidate 110 to enter natural language descriptions 140 to the online system 130.

The language model server 160 stores and executes the machine learning-based language model 155. The language model server 160 receives a prompt from the online system 130 and executes the machine learning-based language model 155 with the prompt as input to generate as response. The language model server 160 sends the response back to the online system 130. An interaction between the online system 130 and the language model server 160 may be described as an interaction between the online system 130 and the machine learning-based language model 155.

In an embodiment, the machine learning-based language model 155 is a large language model (LLM) that is trained on a large corpus of training data to generate outputs for natural language processing tasks. An LLM may be trained on massive amounts of text data, often involving billions of words or text units. An LLM may be trained on a large amount of data from various data sources, for example, websites, articles, posts on the web, and so on. An LLM may have a significant number of parameters in a neural network (e.g., transformer architecture), for example, several billion or even over a trillion parameters. In one instance, the LLM may be trained and deployed or hosted on a cloud infrastructure service. According to an embodiment, the LLM has a transformer-based architecture, for example, an encoder-decoder architecture and includes a set of encoders coupled to a set of decoders.

The online system 130 interacts with the machine learning-based language model 155. The online system 130 includes synthetic statement generation module 150 that performs synthetic statement generation. The synthetic generation module 150 determines natural language questions 135 to send to the agent 105. The agent 105 retrieves natural language answers 140 to the natural language questions 135 and provides to the synthetic statement generation module 150 via the application 125A running on the client device 120. The synthetic generation module 150 uses the natural language answers 140 to generate a synthetic statement 145 using the machine learning-based language model 155.

The various systems including the online system 130, the client device 120, and th3 language model server 160 interact with each other via a network 115. The network 115 allows computing devices to communicate via wired or wireless connections. The network 115 may include one or more local area networks (LANs) or wide area networks (WANs). The network 115 may transmit encrypted or unencrypted data. The network 115, may refer to any or all of standard layers, for example, the physical layer, the data link layer, the network layer, the transport layer, the session layer, the presentation layer, and the application layer. The network 115 may include physical media for communicating data, such as MPLS lines, fiber optic cables, cellular connections (e.g., 3G, 4G, or 5G spectra), or satellites. The network 115 also may use networking protocols, such as TCP/IP, HTTP, SSH, SMS, or FTP, to transmit data between computing devices. In some embodiments, the network 115 may include Bluetooth or near-field communication (NFC) technologies or protocols for local communications between computing devices.

Figure 1B:
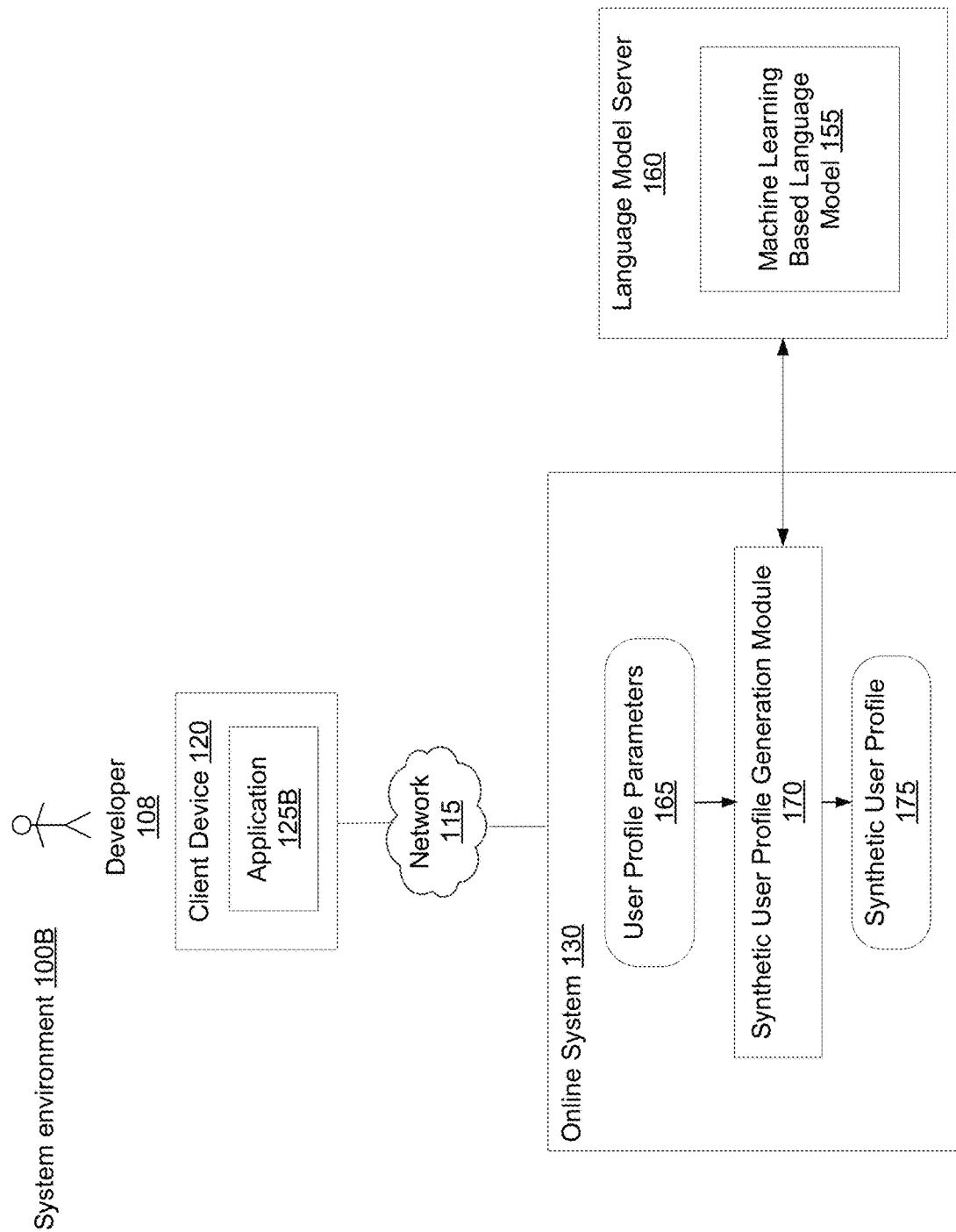
FIG. 1B is a high-level block diagram of a system environment for generation of synthetic user profiles based on a machine learning-based language model, in accordance with an embodiment.

FIG. 1B is a high-level block diagram of a system environment for generation of synthetic user profiles based on a machine learning-based language model, in accordance with an embodiment. The system allows a user such as a developer to use a client device 120 to provide parameters describing details for use in generating a synthetic user profile. The system environment 100B includes one or more client devices 120, the online system 130, the network 115, and the language model server 160 to host the machine learning-based language model 155. The online system 130 includes the synthetic user profile generation module 170 that receives user profile parameters 165 provided by a developer 108 via the client device. The synthetic user profile generation module 170 generates a synthetic user profile 175 based on the received user profile parameters 165 using the machine learning-based language model 155.

The client device 120 runs an application 125B used by a developer 108. The client device 120 interacts with the online system 130 via the network 115. The developer 108 interacts with the online system 130 by providing user profile parameters 165 specific to a desired synthetic user profile 175.

The online system 130 interacts with the language model server 160 that executes the machine learning-based language model 155. The synthetic user profile generation module 170 receives user profile parameters 165 and generates one or more prompts for the machine learning-based language model 155 using the user profile parameters 165. The synthetic user profile generation module 170 receives one or more responses generated by the machine learning-based language model 155 and generates the synthetic user profile 175 based on those responses.

System Architecture

Figure 2:
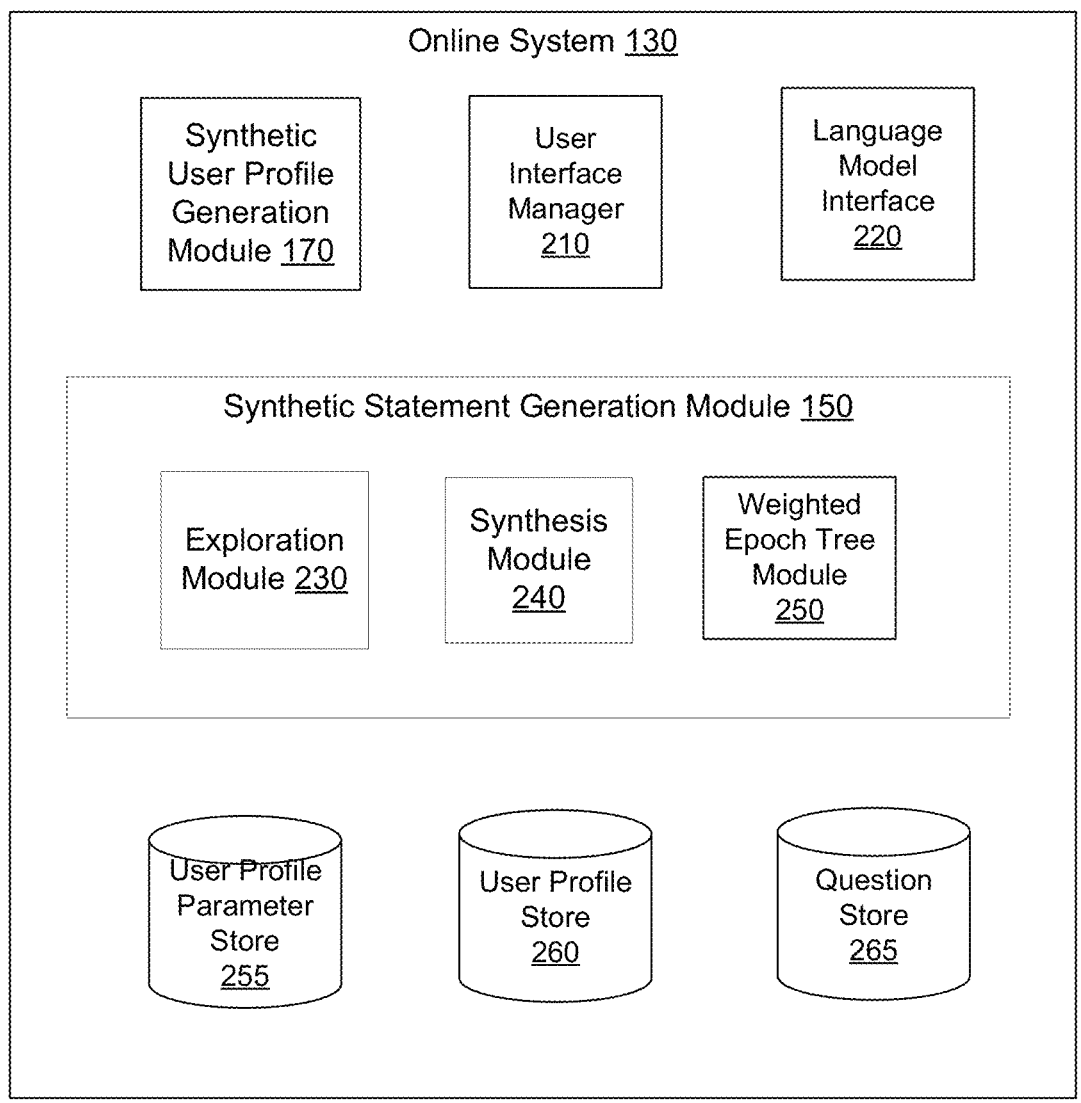
FIG. 2 shows the system architecture of an online system for generating synthetic statements and synthetic user profiles, in accordance with an embodiment.

FIG. 2 shows the system architecture of an online system for generating synthetic statements and synthetic user profiles, in accordance with an embodiment. The online system 130 includes a synthetic user profile generation module 170, a user interface manager 210, a language model interface 220, a synthetic statement generation module 150, a user profile parameter store 255, a user profile store 260, and a question store 265. Other embodiments may include more or fewer modules within the online system 130.

Figure 5:
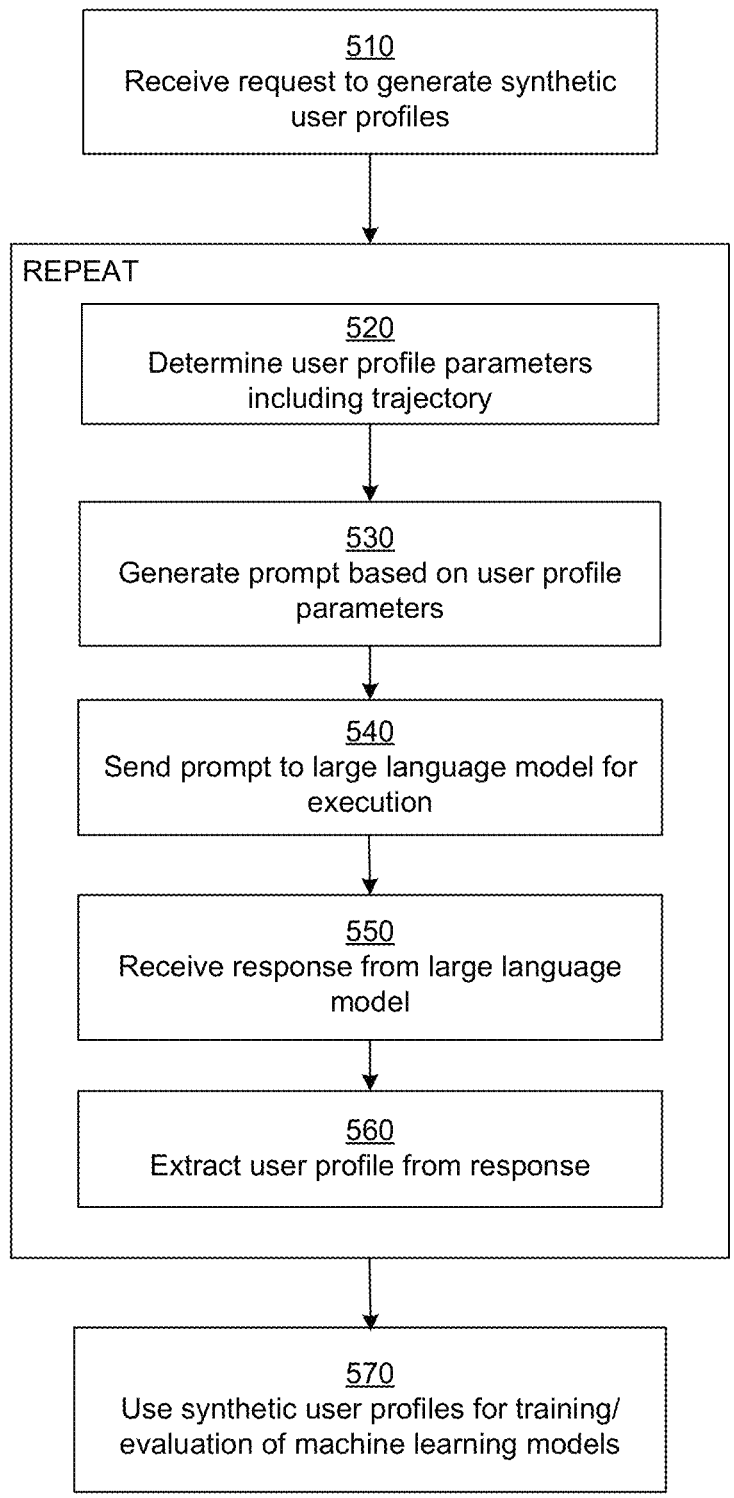
FIG. 5 shows a flowchart illustrating a process for synthetic profile generation, in accordance with an embodiment.

The synthetic user profile generation module 170 generates synthetic user profiles according to processes described herein, for example, the process illustrated in FIG. 5. The synthetic statement generation module 150 generates synthetic statements according to processes described herein, for example, the process illustrated in FIGS. 8 and 10.

The user interface manager 210 configures user interfaces for display via applications 125A, 125B. The user interfaces configured by the user interface manager 210 for display via the client application 125A allow a user, for example, an agent 105 to access natural language questions 135 generated by the synthetic statement generation module 150 and provide natural language answers 140 to the synthetic statement generation module 150. The user interfaces configured by the user interface manager 210 for display via the client application 125B allow a user, for example, a developer 108 to provide user profile parameters to the synthetic user profile generation module 170 for generating a user profiles.

According to an embodiment, the developer 108 may provide multiple values for each user profile parameter 165. The user profile parameters 165 may be stored in the user profile parameter store 255. According to an embodiment, the synthetic user profile generation module 170 accesses various values of the user profile parameters 165 to combine them generate various combinations of user profile parameters 165. This allows the synthetic user profile generation module 170 to generate large number of synthetic user profiles 175 that may be stored in the user profile store 260.

According to an embodiment, the synthetic statement generation module 150 accesses the synthetic user profiles 175 stored in the user profile store 260 to generate synthetic statements. The synthetic user profiles 175 may be used for testing and validation of the synthetic statement generation module 150. Large number of synthetic user profile 175 and corresponding synthetic statements 145 may be used for training and fine tuning the machine learning-based language model 155 to improve the accuracy of the machine learning-based language model 155.

The language model interface 220 interacts with the language model server 160. According to an embodiment, the language model interface 220 receives prompts generated by the synthetic statement generation module 150 or the synthetic user profile generation module 170 and send the prompt to the language model server 160. The language model server 160 executes the machine learning-based language model 155 using the received prompt to generate a response. The language model server 160 sends the response to the language model interface 220 of the online system 130 for providing to the module that sent the prompt.

The question store 265 stores a set of natural language questions 135 for providing to the agent 105. The natural language questions 135 stored in the 265 are relevant for various contexts. For example, a natural language question 135 provided to the candidate 110 when starting the conversation may be different from a natural language question 135 provided to the candidate 110 while exploring to obtain details of a specific event that happened in the users life. According to an embodiment, the question store 265 is a vector database that stores vector representations of various natural language questions 135. The question store 265 receives a vector representation of a context for which a natural language question 135 is required and performs a semantic search for a relevant question. For example, the question store 265 matches the vector representation of the context for the question with natural language questions 135 stored in the 265 based on a distance metric such as cosine similarity to identify the best natural language questions 135 relevant to a given context.

Synthetic User Profile Generation

Figure 3:
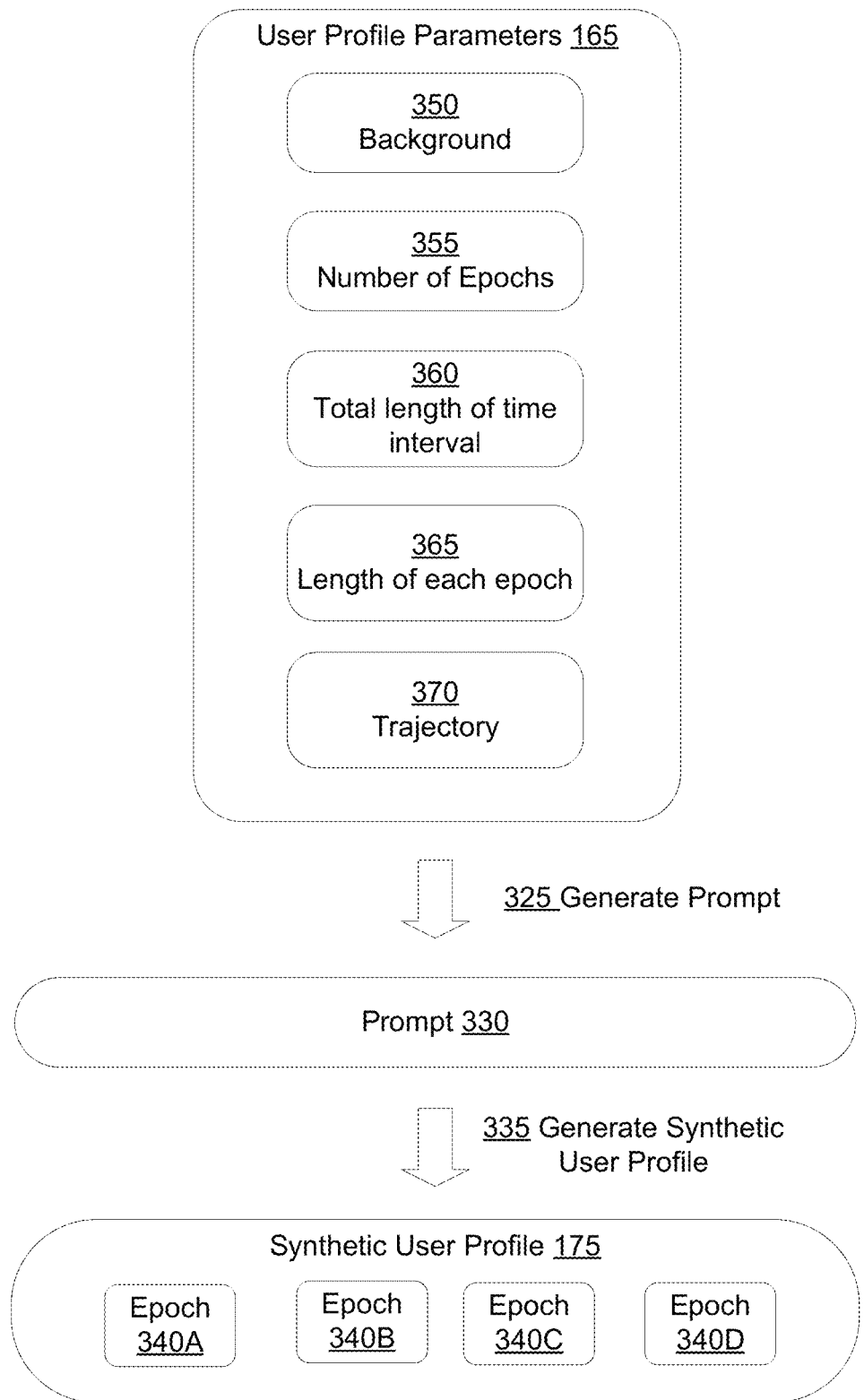
FIG. 3 illustrates the process of generation of a synthetic user profile, in accordance with an embodiment.

FIG. 3 illustrates the process of generation of a synthetic user profile, in accordance with an embodiment. FIG. 3 illustrates the process executed by the synthetic user profile generation module 170. Accordingly, the synthetic user profile generation module 170 receives the user profile parameters to generate one or more prompts 330 which is provided to the machine learning-based language model 155. The responses obtained by executing the machine learning-based language model 155 using the prompts 330 is used by the synthetic user profile generation module 170 to generate the synthetic user profile 175.

The user profile of the user comprises a set of epochs, each epoch representing a phase in the life of the user, for example, a time duration when the user was working for a particular employer, or the time duration when the user was in a particular educational institution. Each epoch is associated with a relevance score determined based on the type of events that occurred within the time interval corresponding to the epoch. The relevance score is defined for the particular domain specific application for which the synthetic user profile 175 is being used. For example, for a domain specific application that is related to a particular job, epochs representing experience of the candidate that matches the job description have higher relevance score compared to epochs representing experience of the candidate in unrelated fields. In contrast for a domain specific application for a candidate seeking asylum for immigration to a country, epochs showing events that indicate persecution in the country of origin of the candidate show higher relevance score compared to events that show the candidate living an affluent life style in the home country.

The user profile parameters 165 include a background 350, number of epochs 355, the total length of the time interval 360 for the epochs, the length of each epoch 365, and a trajectory 370. The background 350 describes information about the candidate 110 before the time period of which the epochs 340 are generated. The background 350 may describe the history of the candidate 110; the income status of the candidate 110, the community where the candidate 110 grew up, or the level of education achieved by the candidate 110 and so on.

The number of epochs 355 to be generated may be any reasonable positive number, for example, 3 epochs, 10 epochs, or 5 epochs. According to an embodiment, the synthetic user profile generation module 170 generates a natural language description of the background 350 by providing individual details of the various attributes of the background to the machine learning-based language model 155. The user profile parameters 165, total length 360 of the time interval for the epochs represents the entire time interval in the life of the candidate 110 that needs to be analyzed for generating the synthetic user profile 175. The user profile parameters 165 may include the length 365 of each epoch, depending on the number of epochs 355. The length of various epochs may be represented as an array. The length 365 of each epoch may be generated as random value that add up to the total length 360 of the time interval for the epochs 360. The user profile parameters 165 may include a start year for the first epoch (not shown in figure) which may be used to calculate the specific years when each epoch 340 occurred based on the length of each epoch 365. The user profile parameter 165 trajectory 370 determines the types of events occurring within each epoch 340.

According to other embodiment, additional user profile parameters (not shown in FIG. 3) are included. The user profile parameters 165 may specify the length of individual epochs. The user profile parameters 165 may specify an epoch size array such that the $i^{th}$ element of the epoch size array specifies the size of the $i^{th}$ epoch in terms of time units such as number of years or months. The number of elements in the epoch size array matches the number of epochs 355 user profile parameter. As an example, the epoch size array A1 may be specified as [2, 4, 3] indicating that the first epoch should be two years long, the second epoch should be 4 years long and the third epoch should be 3 years long. The user profile parameters 165 may further specify the time representing the first epoch, for example, a specific year when the first epoch should start. The synthetic user profile generation module 170 uses the time of the first epoch and the individual epoch sizes to determine the time ranges of each epoch. For example, in the above example, if the first epoch is specified as starting in the year 1970, the time range of the first epoch would be 1970-1971 since the first epoch is two years long, the time range of the second epoch starts after the end of the first epoch, for example, in 1972 and ends after 4 years resulting in the time range of the second epoch being 1972-1975, and so on.

According to an embodiment, the user profile parameters 165 specifies the individual time ranges of each epoch. Accordingly, the user profile parameters 165 includes an array of time ranges having as many elements as specified by the number of epochs 355 user profile parameter. Each time range may be specified as a tuple including the start of the time range and end of the time range. As an example, the epoch size array A2 may be specified as [(1970, 1971), (1972, 1975), (1976, 1978)] indicating that the first epoch has the time range 1970-1971, the second epoch has the time range 1972-1975, and the third epoch has the time range 1976-1978. Although the above examples use a year as the time unit, the user profile parameters 165 may be specified time units with finer granularity, for example, in terms of specific months or days. B Accordingly, a time range may be specified as (March 1970, July 1974), of (1 Mar. 1970, 10 Jul. 1974.) The synthetic user profile generation module 170 determines the information describing the epochs to be generated and specified in the prompt that is generated and provided to the machine learning-based language model 155.

According to an embodiment, the synthetic user profile generation module 170 allows users to specify a hierarchical structure of epochs in the user profile parameters 165. Accordingly, the user profile parameters 165 allow an epoch to include multiple epochs (or sub-epochs), wherein each sub-epoch could comprise other sub-epochs. A sub-epoch is referred to herein as an epoch. For example, the user profile parameters 165 specifies the sizes of epochs using a nested data structure that is nested array, wherein each element of the nested array can be a scalar value or another nested array. An example of a nested array A3 used to specify the epoch structures for a user profile being generated is [[S1, S2], S3, [S4, S5, S6]] where S1, S2, S3, S4, S5, and S6 specify numbers of time units. For example, S1 may represent 2 years and 3 months, S2 may represent 3 years and 4 months, and so on. This example nested structure specifies that the generated user profile should have three epochs, for example, E1, E2, and E3; the first epoch E1 includes two sub-epochs, first sub-epoch of size S1 and second sub-epoch of size S2; the second epoch E2 is not nested and has size S3; the third epoch E3 has three sub-epochs, the first sub-epoch has size S4, second sub-epoch has size S5, and third sub-epoch has size S6. The nested structure may be specified using other format such as JSON (JavaScript Object Notation), XML (extended markup language), or any proprietary format that can be analyzed by the synthetic user profile generation module 170.

The synthetic user profile generation module 170 may specify the entire nested structure in the prompt provided as input to the machine learning-based language model 155 with instructions describing how to process the nested structure. The synthetic user profile generation module 170 may analyze the nested structure or a simple array used to specify epoch sizes to generate description of individual epochs to be generated in the synthetic user profile. For example, a prompt generated from the nested array A3 may request the machine learning-based language model 155 to generate a user profile with three epochs such that the first epoch includes two sub-epochs of sizes S1 and S2 respectively, the second epoch ahs size S3, and the third epoch includes three sub-epochs of sizes S4, S5, and S6.

Some of the user profile parameters 165 are optional. For example, a user may specify the epoch size array and not provide the epochs 360 parameter. The synthetic user profile generation module 170 may derive the epochs 360 parameter by adding up the sizes of individual epochs as specified using the epoch size array parameter. The synthetic user profile generation module 170 may analyze the user profile parameters 165 top validate the parameters, for example, check various ranges of the epochs if specified, to ensure that the ranges don't overlap, there are no gaps between ranges, and the total time period matches epochs 360 parameter if specified. If there are inconsistencies in the user profile parameters 165, the synthetic user profile generation module 170 may report the inconsistencies to the user via the application 125 so that the user can revise the values of the user profile parameters 165.

According to an embodiment, the synthetic user profile generation module 170 generates 325 the prompt 330 by inserting the user profile parameters 310 into a prompt template. The synthetic user profile generation module 170 sends the prompt 330 to the machine learning-based language model 155 to generate 335 the synthetic user profile 175. The details of the process are further illustrated in FIG. 5 and described in connection with FIG. 5.

Figure 4:
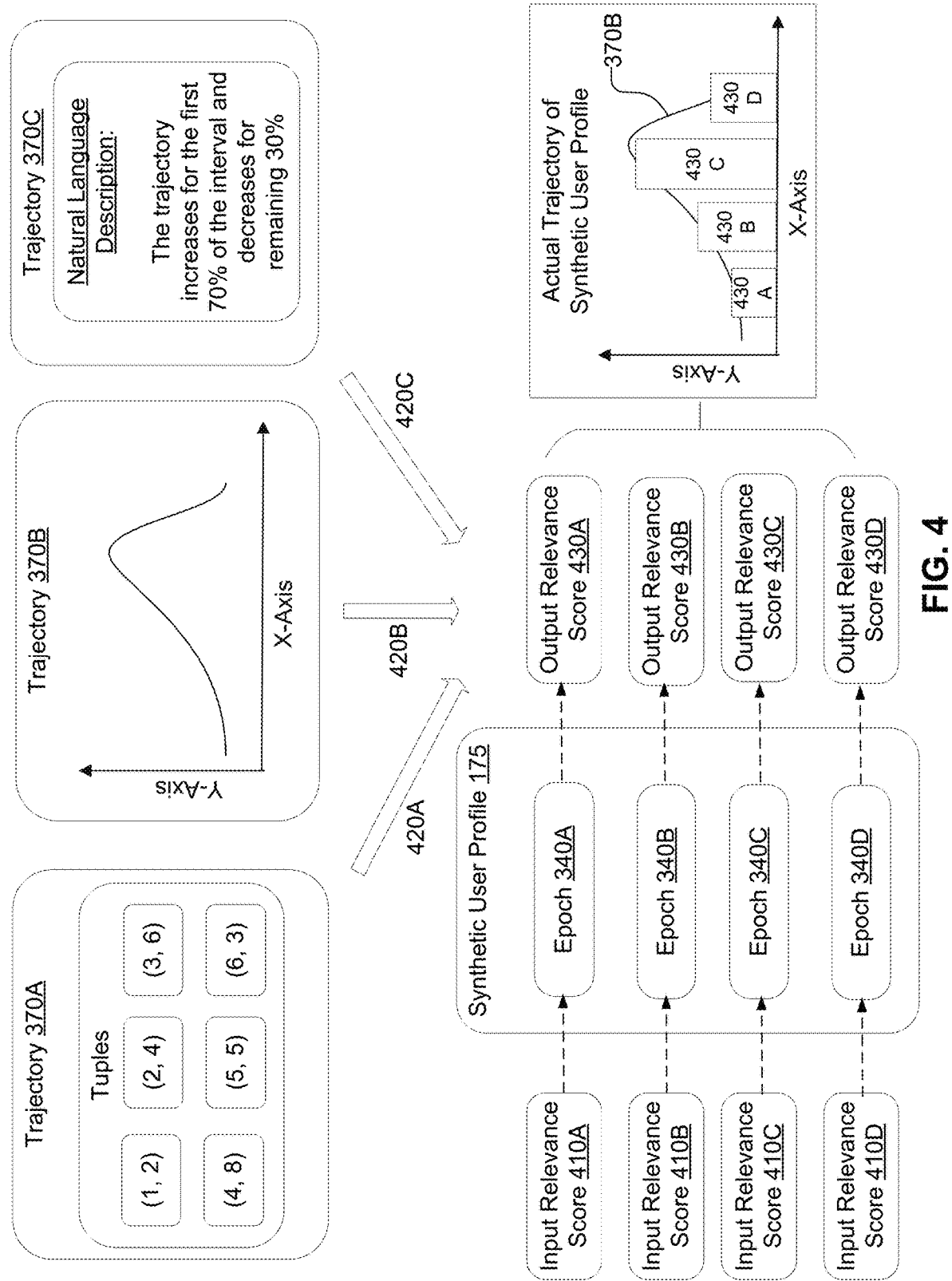
FIG. 4 illustrates various ways to specify the trajectory user profile parameter to generate synthetic user profiles, in accordance with an embodiment.

FIG. 4 illustrates various ways to specify the trajectory user profile parameter to generate synthetic user profiles, in accordance with an embodiment. The same trajectory 370 can be specified using different representations including a set of tuples, an image, and a natural language description. The trajectory 370 represents how the synthetic score if expected to vary across various epochs that need to be generated in the synthetic user profile for a hypothetical candidate. For example, the trajectory 370 may indicate a continuously improving synthetic score value over time; the trajectory 370 may indicate a synthetic score value decreasing over time; the trajectory 370 may indicate a synthetic score value that improves over time for an initial set of epochs but decreases for remaining epochs; the trajectory 370 may indicate a synthetic score value that decreases over time for an initial set of epochs but increases for remaining epochs. The user profiles having different types of trajectories allows a developer to test and evaluate the performance of synthetic statement generation module 150 or for training and fine tuning the machine learning-based language model 155. The different types of trajectory 370 allow testing of various scenarios for each domain specific application. For example, a user profile having a trajectory 370 that shows continuous improvement of significance score over time results in different outcome compared to a user profile having a trajectory 370 that shows continuous decrease of significance score over time. As a result, these two trajectories exercise different parts of the code of the synthetic statement generation module 150. Having user profiles with various types of trajectories 370 allows a developer to execute various code paths of the synthetic statement generation module 150 to test and evaluate the code, for example, for unit testing of the code or for performance evaluation of the code. Furthermore, having user profiles with different trajectories 370 allows training of the machine learning-based language model 155 based on a variety of user profiles and corresponding synthetic statements having a uniform distribution rather than a training dataset with a skewed distribution.

According to an embodiment illustrated using process 420A, the online system allows the user to specify the trajectory parameter 370A as a set of tuples. The tuples may represent a set of coordinates corresponding to the trajectory 370. Each coordinate is a pair of x-coordinates and y-coordinates. The set of tuples illustrated in trajectory 370A are (1,2), (2,4), (3,6), (4,8), (5,5), and (6,3). As shown, the y coordinate values increase for the first four tuples and then begin decreasing for the remaining two tuples.

In some embodiments, trajectory 370A is given to the machine learning language-based model 155 as the input was specified by the user. The prompt given to the machine learning-based language model 155 gives instructions on how the machine learning-based language model 155 will map the tuples to an input relevance score 410 for the epochs 340 being generated. The input relevance score 410 refers to the expected value of the relevance score for the epoch 340 generated. If the number of tuples matches the number of epochs 355, the input relevance score 410 for each epoch 340 will match the y-coordinate scaled appropriately to normalize the distribution of epoch lengths 365. The number of epochs 355 may not match the number of tuples. In this scenario, the prompt specifies instructions to use interpolation or extrapolation to determine the appropriate input relevance scores 410 for each epoch 340 based on the tuples. In alternate embodiments, a program written in a programming language invokes mathematical libraries or functions to determine the input relevance score 410 for each epoch 340.

According to an embodiment, as illustrated by process 420B, the online system 130 permits the user to specify the trajectory parameter 370B as an image representing a graph. The graph may be a line, bar, scatter, histogram, or any other representation of varying y values corresponding to x values. The user interface manager 210 may present the user with a user interface including a widget to draw the image or upload an existing image. Similar to trajectory 370A, the graph displays a trajectory that is increasing in the initial portion of the graph and then decreasing in the latter portion of the graph.

In some embodiments, trajectory 370B is given to the machine learning language-based model 155 as the input was specified by the user. The prompt given has instructions for the machine learning language-based model to extract the input relevance scores 410 for each epoch 340. The machine learning language-based model uses a multimedia input to generate the synthetic user profile 175.

A machine learning image-recognition model such as convolutional neural networks may be used to extract y-coordinates based on their corresponding x-coordinates to form a set of tuples. The tuples are given to the machine learning language-based model with the prompt 330 as described for trajectory 370A. The synthetic user profile generation module 170 executes the process 420A.

According to an embodiment, as illustrated by process 420C, the online system 130 permits the user to specify the trajectory parameter 370C as a natural language description. The natural language description may describe how the trajectory changes with time, for example, whether the trajectory is increasing, decreasing, or remaining constant during a subinterval of the total trajectory 370. The synthetic user profile generation module 170 includes a natural language description for trajectory 370C in the prompt 330 and sends the prompt 330 to the machine learning-based language model to generate the synthetic user profile 175. In alternate embodiments, the synthetic user profile generation module 170 generates a prompt that includes trajectory 370C with a request to generate tuples. The synthetic user profile generation module 170 executes the process 420A with the tuples in the prompt 330.

The trajectory is specified as a graph or a curve in a two dimensional plane with an X-axis and Y-axis. The Y-axis represents the relevance score values. According to an embodiment, the synthetic user profile generation module 170 interprets the X-axis as time such that each unit distance along the X-axis corresponds to a unit of time, for example, a year. The synthetic user profile generation module 170 divide the entire time period for which the user profile is being generated into equal size intervals and map each interval to a unit of X-axis of the trajectory. Accordingly, an epoch that spans over a longer time interval corresponds to a larger portion of the X-axis corresponding the trajectory compared to a smaller epoch.

According to another embodiment, the synthetic user profile generation module 170 divides the X-axis equally amongst the epochs independent of their individual sizes. For example, if the number of epochs to be generated is five, the synthetic user profile generation module 170 divides the X-axis of the trajectory into 5 equal intervals independent of the sizes of each epoch and assigns the epochs to the intervals of the X-axis. The relevance score for an epoch is determined based on the values of the Y-axis corresponding to the interval of X-axis assigned to the epoch. The synthetic user profile generation module 170 may determine an aggregate of the Y-axis coordinates as the representative relevance score value for the interval. For example, the synthetic user profile generation module 170 may use the Y-coordinate value of the mid-point of the interval as the relevance score for that interval or determine an average of the y-coordinate values for the interval as the relevance score for that interval. The prompt requests the machine learning-based language model 155 to generate the synthetic description of each epoch so that the synthetic description of the epoch would have a relevance score matching the relevance score determined for the corresponding interval as specified by the trajectory.

According to an embodiment, if the sizes of epochs are specified using a hierarchical structure such as nested arrays, the synthetic user profile generation module 170 treats the epochs at the leaf nodes as the individual epochs. Accordingly, in the above example of nested array A3, the synthetic user profile generation module 170 determines that the number of leaf nodes of the epoch is 6 and divides the X-axis of trajectory into 6 intervals, either having sizes proportionate to the sizes of the individual epochs or having equal sizes independent of the sizes of the epochs. The synthetic user profile generation module 170 aggregates the sizes of leaf nodes to determine the sizes of internal nodes representing composite epochs that comprise sub-epochs. Accordingly, the synthetic user profile generation module 170 may aggregate the sizes of epochs by traversing up from the leaf nodes to determine sizes of all epochs.

The synthetic user profile generation module 170 matches the input relevance scores 410 for each epoch 340 to the output relevance scores 430 extracted from the generated synthetic user profile 175. The graph 440 illustrates the comparison of input relevance scores to their corresponding output relevance scores. If the input relevance scores 410 match the output relevance scores 430 for each epoch 340, the synthetic user profile 175 will be stored within the user profile store 260. If the synthetic user profile generation module 170 determines that one or more input relevance scores 410 do not match the output relevance score 430, a prompt is generated and sent to the machine learning-based language model 155 to revise the epochs 340 within the synthetic user profile 175 so that the corresponding output relevance scores 430 match the input relevance scores 410. The prompt will specify the synthetic user profile 175 and the epochs 340 within the synthetic user profile 175 that do not have matching output relevance scores 430 to their input relevance scores 410 with a request to modify those epochs 340 such that their output relevance score 430 matches the input relevance scores 410.

FIG. 5 shows a flowchart illustrating a process for synthetic profile generation, in accordance with an embodiment. The steps shown may be performed in an order different from that indicated in FIG. 5. The steps may be performed by modules other than those indicated herein. The online system may use the user profiles stored in the user profile store 260 for the training and evaluation of machine learning models. For example, developers may use the user profiles generated as illustrated by FIG. 5, by the synthetic user profile generation module 170 for the testing and evaluation of the synthetic statement generation module 150. For the testing and evaluation of the synthetic statement generation module 150, developers need various types of user profiles to force the code to execute various possible scenarios. The synthetic user profile generation module 170 allows the online system 130 to generate various user profiles.

The synthetic user profile generation module 170 receives 510 a request to generate synthetic user profiles. The synthetic user profile generation module 170 repeats 520, 530, 540, 550, and 560 for each user profile generated.

For each user profile, the synthetic user profile generation module 170 determines 520 user profile parameters including background, the number of epochs, the length of each epoch, and trajectory. The synthetic user profile generation module 170 generates 530 a prompt using these user profile parameters and sends 540 the prompt to the machine learning-based language model 155. The machine learning-based language model executes 540 the prompt and sends a response to the synthetic user profile generation module 170. The synthetic user profile generation module 170 receives 550 the response generated by the machine learning-based language model 155. The synthetic user profile generation module 170 extracts 560 the user profile from the response received. The synthetic user profile generation module 170 stores the extracted user profiles in the user profile store 260. These steps are repeated to generate multiple user profiles.

The processes illustrated in FIGS. 3-5 generate synthetic user profiles 175 for various domain-specific applications. User profiles for various domain-specific applications may not be accessible due to privacy reasons. For example, in legal fields, data may not be available such as user profiles for expungement of criminal records, user profiles for candidates seeking asylum. In medical fields, the Health Insurance Portability and Accountability Act (HIPAA) establishes national standards to protect individuals' medical records and identifiable health information. In cases such that the user profiles are accessible, outlying scenarios may not be available to test all possible code paths of these algorithms. Examples of such applications include applications that process resumes of job applicants.

For such domain specific applications, the techniques disclosed here help generate synthetic data for testing and evaluation of algorithms such as machine learning-based language models.

Synthetic Statement Generation

Figure 6:
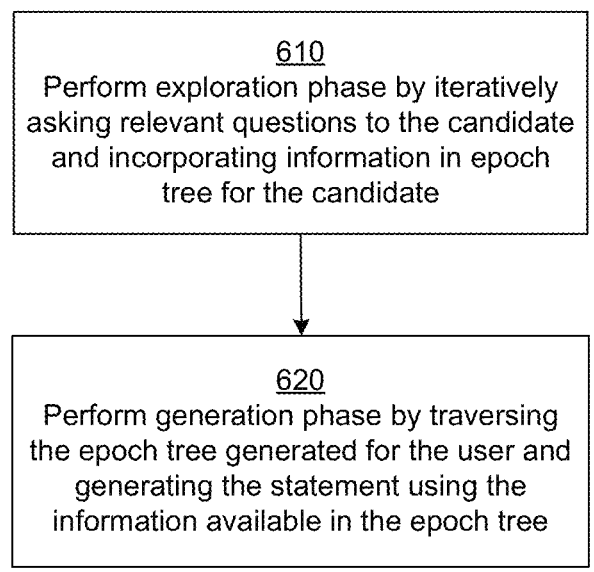
FIG. 6 shows a flowchart illustrating the overall process of generating a synthetic statement, in accordance with an embodiment.

FIG. 6 shows a flowchart illustrating the overall process of generating a synthetic statement, in accordance with an embodiment.

The exploration module 230 of the synthetic statement generation module 150 performs the exploration phase by iteratively asking relevant natural language questions 135 to the candidate 110 and incorporating information received as the natural language answers 140 in the weighted epoch tree 250 for the candidate 110. The candidate 110 may be a person interacting with an agent 105 who interacts with the online system 130 using the application 125A. In alternative embodiments, the candidate 110 is an automated process with which the synthetic statement generation module 150 interacts by sending natural language questions 135 to the automated process and receiving natural language answers 140. The automated process may interact with the machine learning-based model 155 to generate a natural language answer 140 in response to receiving the natural language question 135 on the fly.

The synthesis module 240 of the synthetic statement generation module 150 performs the generation phase by traversing the weighted epoch tree 250 generated for the user and generating the synthetic statement 145 using the information available in the weighted epoch tree 250. The details of the exploration phase 610 are illustrated in FIG. 9. The details of the synthesis phase 620 are illustrated in FIG. 10.

Figure 7:
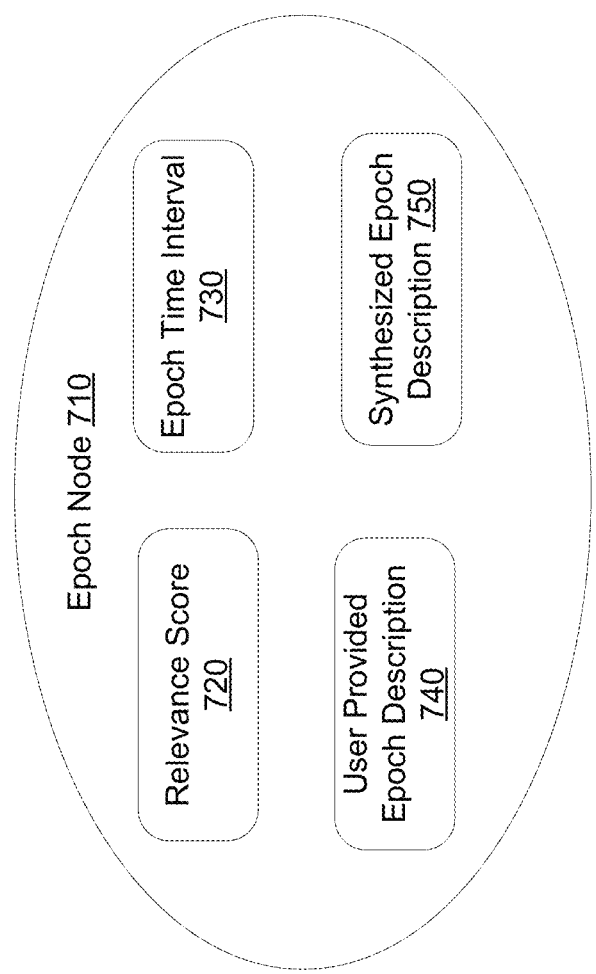
FIG. 7 illustrates the structure of an epoch node used for building a weighted epoch tree, in accordance with an embodiment.

FIG. 7 illustrates the structure of an epoch node used for building a weighted epoch tree, in accordance with an embodiment.

The epoch node 710 is used in the weighted epoch tree 250. Each epoch node 710 in the weighted epoch tree 250 represents an epoch which is a time interval or phase in a candidate's life and its corresponding events. The epoch node 710 stores a relevance score 720, epoch time interval 730, user provided epoch description 740, and a synthesized epoch description 750.

The relevance score 720 determines its relevance in the weighted epoch tree 250 and the synthetic user profile 175. The relevance score 720 is defined based on the domain-specific problem for which the epoch tree is being used. The relevance score 720 is stored as a number value. The relevance score 720 may be implemented using a callback or lambda function. The relevance score 720 may be defined in an abstract class and calculated in a concrete subclass of the abstract class.

The epoch time interval 630 is the duration of time that a set of events in the candidate's 110 life takes place.

The user-provided epoch description 740 is the raw description provided by the candidate 110 as their natural language answer 145 or a combination of multiple natural language answers 145.

The synthesized epoch description 750 is a concise description with relevant details extracted from the user-provided epoch description 740. The synthesized epoch description 750 is generated by the machine learning-based language model 155. The synthesized description 750 includes summarized details of all the epochs nodes 710 in its subtree. The synthetic statement generation module 150 may create the synthesized description by recursively traversing the weighted epoch tree 250. If the current epoch node 710 is a leaf node, signifying that it does not have child nodes, the synthetic statement generation module 150 sends the user-provided epoch description 740 of the current epoch node 710 to the machine learning-based language model 155 in a prompt requesting to generate the synthesized epoch description 750. If the current epoch node 710 is not a leaf node, signifying that it does have child nodes, the synthetic statement generation module 150 will traverse the child nodes and retrieve their synthesized epoch descriptions 750 which are sent to the machine learning-based language model in a prompt requesting to synthesize the synthesized epoch description 750 for the current epoch node 710.

Figure 8:
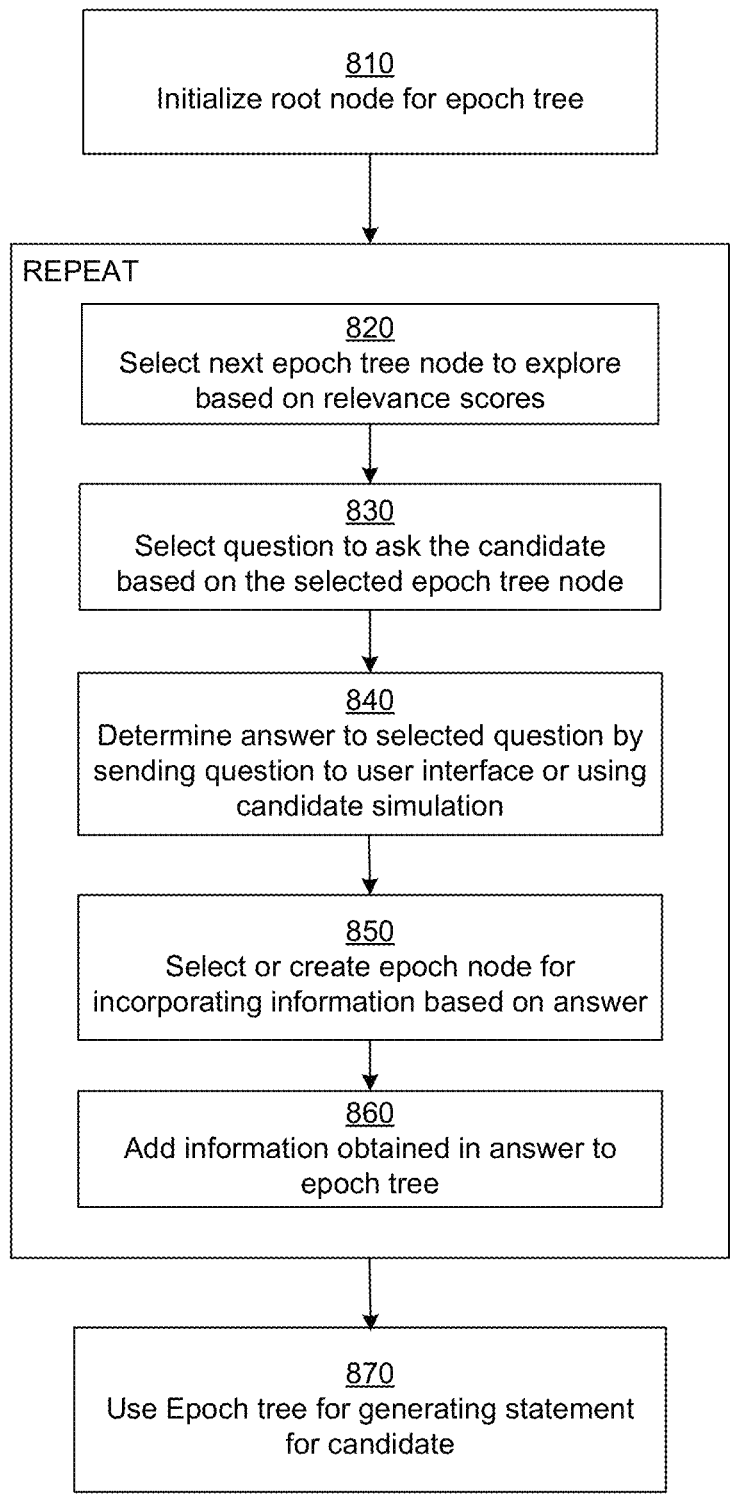
FIG. 8 illustrates a flowchart of the process for building a weighted epoch tree based on user provided information, in accordance with an embodiment.

FIG. 8 illustrates a flowchart of the process for building a weighted epoch tree based on user provided information, in accordance with an embodiment.

The exploration flowchart FIG. 8 guides the agent 105 through a sequence of questions to ask the candidate 110 to collect information relevant to the synthetic statement 145. Different sections of the synthetic statement 145 may require different types of information. For example, in a synthetic statement 145 generated for the expungement of criminal records, the background section will need information describing hardships the candidate 110 has faced in their life whereas, the main body paragraph will need information describing positive changes that were brought by the candidate 110 during their time in or after prison. According to an embodiment, the synthetic statement generation module 150 generates multiple weighted epoch trees 250 with one for each section that requires a particular type of information. Each weighted epoch tree 250 is traversed while executing the process illustrated in FIG. 10 for generating specific sections. Each weighted epoch tree 250 is generated based on different relevance scores 720, each relevance score 720 based on a definition specific to a particular section.

The exploration module 230 initializes 810 the root node of the weighted epoch tree 250. Broad natural language questions 135 may be used to retrieve natural language answers 140 while initializing 810 the root node. The root node has a time interval that encompasses 810 all events described in the subtrees of the weighted epoch tree 250. The time interval of the root node 810 for the weighted epoch tree 250 is determined by the domain-specific problem being addressed for which the weighted epoch tree 250 is being used. The root node epoch node 710 initialization is illustrated in 910A. An epoch 710 may be defined as a period in the life of a candidate 110 during which certain aspects of the candidate's 110 life maintain the status. The exploration module 230 repeats 820, 830, 840, 850, and 860 until stopping criteria met.

The exploration module 230 traverses the weighted epoch tree 250 to select 820 the next epoch tree node to explore based on relevance scores 720. In one embodiment, the exploration module 230 selects the leaf node epoch node 710 with the highest relevance score 720 for further exploration. The leaf epoch node 710 with the highest relevance score 720 is most likely to have relevant information to the domain-specific problem.

The exploration module 230 selects 830 a question to ask the candidate 110 based on the current epoch node 710 that was selected 820. The exploration module 230 will select 830 a natural language question from a vector database. The vector database will store vector representations of questions. The questions may be obtained from an expert. In some embodiments, a set of questions will be added to the vector database from machine learning-based language model question generations. For example, given the context of the current epoch node 710 in the weighted epoch tree 250 and sample questions provided by the expert, a prompt is generated for the machine learning-based language model 155 to generate further questions that will be stored in the vector database.

The exploration module 230 determines 840 an answer to the selected 830 question. In an embodiment, the question is sent to the application 125A and shown to the agent 105. The agent 105 will ask the candidate 110 the natural language question 135 and the candidate 110 will provide a natural language answer 140. The agent 105 provides the natural language answer 140 to the synthetic statement generation module 150 via the application 125A.

In another embodiment, the online system 130 executes a candidate process that simulates the candidate 110. The candidate process loads a user profile from the user profile store 260. The synthetic statement generation module 150 sends a natural language question 135 to the candidate process. The candidate process generates a prompt based on the natural language question 135. For example, the prompt asks the machine learning-based language model 155 how the candidate 110 would respond to the natural language question 135 based on the user profile extracted from the user profile store 260. The synthetic statement generation module 150 sends the natural language question 135 to the machine learning-based language model 155 and receives a natural language answer 140 and sends the natural language answer 140 to the synthetic statement generation module 150. This process may be repeated for different user profiles from the user profile store 260.

In another embodiment, an agent process acts as a proxy to the candidate process that simulates the candidate 110. The agent process receives a natural language question 135 from the synthetic statement generation module 150 and sends the natural language question 135 to the candidate process. The candidate process sends the natural language question 135 to the synthetic statement generation module 150.

The synthetic statement generation module 150 adds 860 the natural language answer 140 to the user-provided epoch description 740 within the epoch node 710. According to an embodiment, the synthetic statement generation module 150 determines whether to create 850 child epoch nodes 710 under the current epoch node 710. The synthetic statement generation module 150 determines whether to create 850 two or more child epoch nodes 710 by generating a prompt and sending it to the machine learning-based language model 155. The synthetic statement generation module 150 specifies examples and the definition of an epoch in the prompt. If the synthetic statement generation module 150 receives a response from the machine learning-based language model stating that the epoch cannot be subdivided into child epoch nodes 710, the synthetic statement generation module 150 generates a new prompt asking for details from the epoch node 710 in the form of specific events or happenings. Alternatively, the synthetic statement generation module 150 creates 850 a new epoch node 710 to add 860 the information retrieved by the answer determined 840.

As described in FIG. 10, the weighted epoch tree 250 is used to generate 870 the synthetic statement 145.

FIGS. 9A-9D illustrate the process of building an example weighted epoch tree based on the process illustrated in FIG. 8, in accordance with an embodiment.

Figure 9A:
FIGS. 9A-9D illustrate the process of building an example weighted epoch tree based on the process illustrated in FIG. 8, in accordance with an embodiment.
Figure 10:
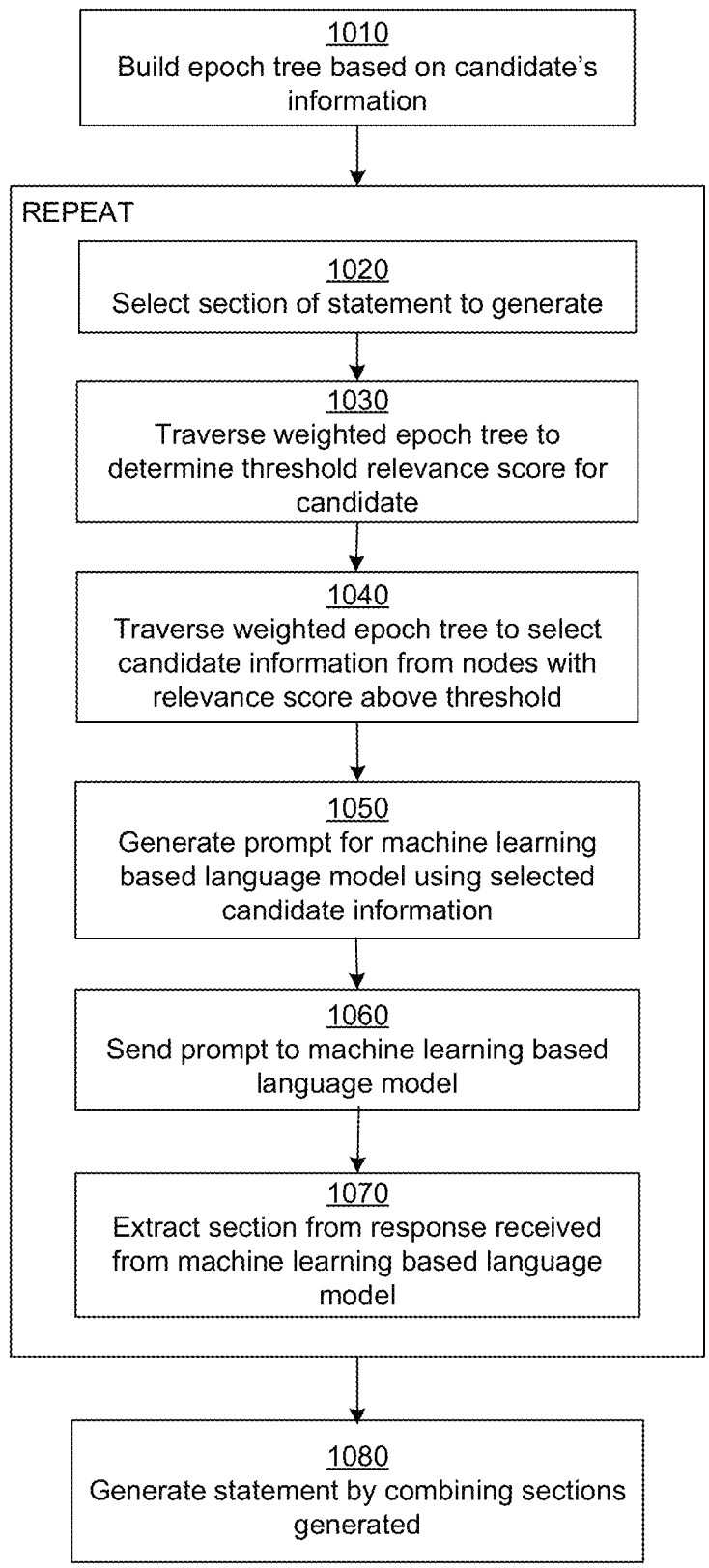
FIG. 10 illustrates the process of generating a synthetic statement based on a weighted epoch tree, in accordance with an embodiment.

The epoch 910A is created with a cumulative epoch time interval 730 as shown in FIG. 9A. The cumulative epoch time interval 730 may be specific to a domain's problem. The cumulative epoch time interval is the total time frame that the weighted epoch tree 250 represents and is being analyzed by the synthetic statement generation module 150 for generating the synthetic statement 145. If the synthetic statement 145 represents the declaration or personal statement for expungement of the candidate's 110 criminal records, the cumulative epoch time interval 730 may represent time after release from prison till the present or may include time in prison. If the synthetic statement 145 represents the declaration or personal statement for asylum declarations or personal statements, the cumulative epoch time interval 730 may depend on the category in which the candidate 110 is seeking asylum. For example, certain categories may include the candidate's 110 birth until the candidate 110 enters their country of destination. If the synthetic statement 145 represents the declaration or personal statement for employment purposes, the cumulative epoch time interval 730 may represent the time from when the candidate 110 graduated to the present and may include relevant time in school.

Figure 9B:
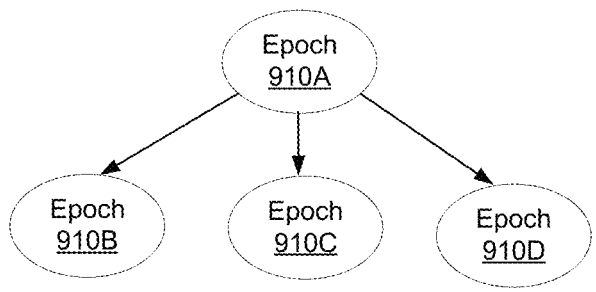

The synthetic statement generation module 150 selects 830 a question and sends the natural language question 135 to the candidate 110 to determine 840 the natural language answer 140. The natural language answer 140 is placed in the current epoch node 710 as the user provided epoch description 740. The synthetic statement generation module 150 synthesizes 750 the user-provided epoch description 740 once the natural language question 135 is received. The synthetic statement generation module 150 generates a prompt including the natural language answer 140 and the synthesized epoch descriptions 750 of the ancestor nodes to determine the number of sub-phases or sub-epochs within the epoch represented by the epoch node 710. The synthetic statement generation module 150 sends the prompt to the machine learning language-based model 155. The synthetic statement generation module 150 receives a natural language answer 140 of the number of sub-phases or sub-epochs and is used to determine the number of child nodes of the current epoch node 710. The synthetic statement generation module 150 creates the child nodes of the current epoch node 710 as shown in FIG. 9B. The synthetic statement generation module 150 assigns the epoch time interval 730, populates a brief user-provided epoch description 740, generates synthesized epoch descriptions 750, and determines initial relevance scores 720 based on the natural language answer 140 for each epoch 910B, 910C, and 910D.

Figure 9C:
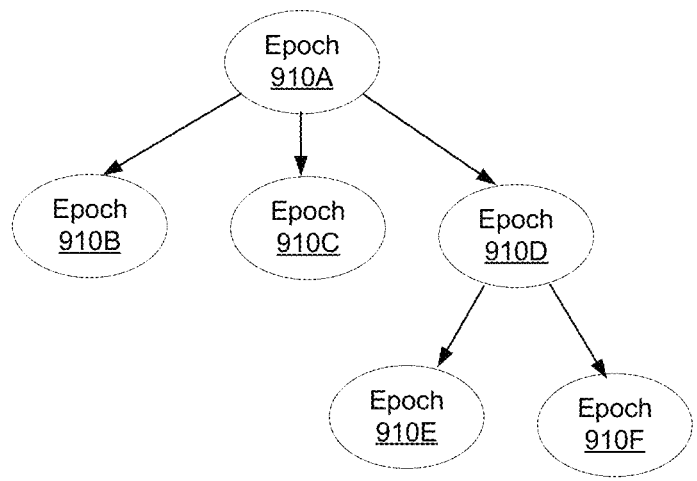
Figure 9D:
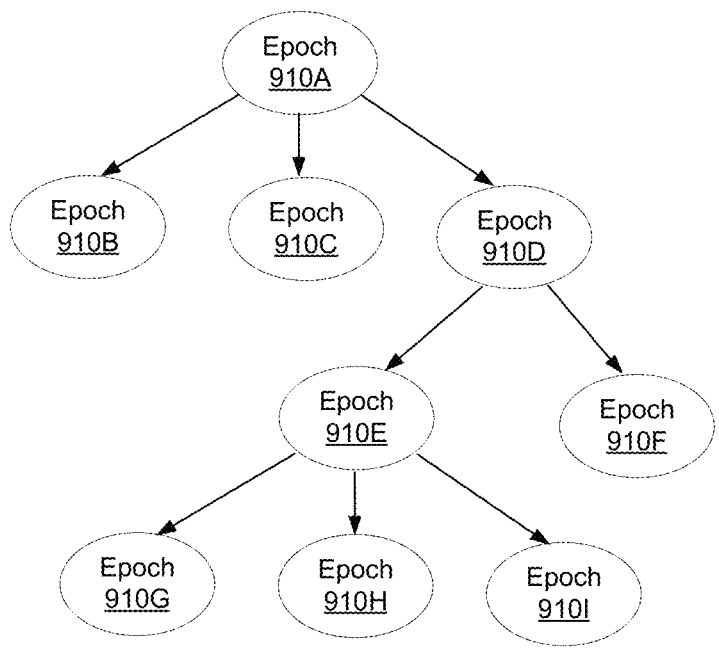

The synthetic statement generation module 150 compares the relevance scores 720 of the nodes 910B, 910C, and 910D to select 820 the next node to explore. Assuming the epoch or node with the highest relevance score 720 is epoch 910D, the synthetic statement generation module 150 further explores epoch 910D to create child nodes 910E and 910F as shown in FIG. 9C. The synthetic statement generation module 150 continues this process to select 820 epoch 910E based on relevance scores 720 and further explores epoch 910E to create child nodes 910G, 910H, and 910I as shown in FIG. 9D.

FIG. 10 illustrates the process of generating a synthetic statement based on a weighted epoch tree, in accordance with an embodiment.

The synthetic statement generation module 150 builds the weighted epoch tree 250 based on the process in FIG. 8. The synthetic statement generation module 150 repeats 1020, 1030, 1040, 1050, 1060, and 1070 for each section of the synthetic statement 145. For example, the synthetic statement 145 may have multiple sections such as the background, introduction, body paragraphs, and conclusion.

The synthetic statement generation module 150 selects 1020 a section of the synthetic statement 145 to generate.

The synthetic statement generation module 150 traverses the weighted epoch tree 250 to determine the threshold relevance score for candidate 110. The synthetic statement generation module 150 determines the threshold relevance score based upon statistical analysis of the relevance scores present in the epoch nodes 710 of the weighted epoch tree 250. For example, the statistical analysis may determine a mean, mode, median, or other analysis based on the distribution of relevance score 720 values.

The synthetic statement generation module 150 traverses the tree once, checking the relevance scores 720 and using statistical analysis to make a recommendation, for example, the recommendation may state that the candidate 110 should continue with the generation of the synthetic statement 145 or it could recommend the candidate 110 take actions to improve aspects of their user profile. For example, the statistical analysis done by the synthetic statement generation module 150 may include determining that certain epoch nodes 710 have extreme low values for their relevance scores 720 or the aggregate relevance score 720 (mean, median, mode, sum) is below a threshold value. Depending on the domain-specific application, the synthetic statement generation module 150 may make a recommendation that identifies specific actions that the candidate 110 should take.

The synthetic statement generation module 150 selects 1040 information describing the candidate 110 that is relevant to the selected 1020 section by traversing the corresponding weighted epoch tree 250 that was generated for the section and selecting epoch nodes 710 that have relevance scores 720 that are above the threshold relevance score. After the synthetic statement generation module 150 has selected an epoch node 710, the synthetic statement generation module 150 extracts the user-provided epoch description 740 or synthesized epoch description 750 and places it in a data structure that will used in 1050. Whether the synthetic statement generation module 150 extracts the user-provided epoch description 740 or the synthesized epoch description 750 is dependent on the domain-specific application. For example, in the expungement of criminal records or declaration of an asylum candidate 110, the synthetic statement generation module 150 uses the user-provided epoch description 740 because the candidate's 110 language provides a more genuine description of the event or epoch. In contrast, in the generation of a job application, the synthetic statement generation module 150 uses the synthesized epoch description 750 to make the description more professional.

The synthetic statement generation module 150 generates 1050 a prompt to send 1060 to the machine learning-based language model 155 using the relevant information selected 1030. The prompt includes information on how to generate the selected 1020 section. The synthetic statement generation module 150 sends 1060 the prompt to the machine learning-based language model 155. The synthetic statement generation module 150 receives a response from the machine learning-based language model 155 and extracts 1070 the section from the received response.

The synthetic statement generation module 150 generates 1080 the synthetic statement 145 by combining all the individual sections.

Applications

The processes in FIGS. 8-10 can be used for generating synthetic statements 145 for various domain-specific applications. The weighted epoch tree 250 and the steps of the processes for exploration and synthetic statement 145 generation remain the same across all applications, however, the relevance score 720 varies across applications and needs to be defined for each application. An application developer 108 may provide a callback function such as a lambda function that includes instructions to compute the relevance scores 720 specific to the application.

The techniques disclosed here can be used for the automatic processing of an asylum application for immigration purposes. An asylum application requires a declaration or personal statement justifying why the candidate 110 is eligible for asylum. An expert agent may use the application to generate a natural language question 135 and ask the candidate 110 to apply for asylum the natural language question 135. The agent will enter the natural language answers into the application 125A. The synthetic statement 145 generated will be entered into their asylum application. The relevance score 720 is high if the events that have occurred in the life of the candidate provide evidence demonstrating either that they have suffered persecution on account of a protected ground in the past, or that they have a well-founded fear of future persecution in their home country. Positive and negative example events that demonstrate persecution will be provided in the prompt for determining relevance scores 720.

The techniques disclosed here can be used for the automatic processing of an expungement application for expunging criminal records. An expungement application requires a declaration or personal statement justifying why the candidate 110 is eligible for expungement. An expert agent may use the application to generate natural language question 135 and ask the candidate 110 applying for expungement the natural language question 135. The agent will enter the natural language answers into the application 125A. The synthetic statement 145 generated will be entered into their expungement application. The relevance score 720 is high if the events that have occurred in the life of the candidate provide evidence demonstrating that the candidate's 110 life has shown improvement. For example, events such as working a job, successfully completing self-help programs, and college education, indicate high relevance scores 720 whereas repeated encounters with law enforcement show low relevance scores. Positive and negative example events that demonstrate improvement will be provided in the prompt for determining relevance scores 720.

The techniques disclosed here can be used for the automatic processing of a job application. A job application requires a cover letter justifying why the candidate 110 is suitable for the job they are applying for. An expert agent may use the application to generate a natural language question 135 and ask the candidate 110 applying for a job the natural language question 135. The agent will enter the natural language answers into the application 125A. The synthetic statement 145 generated will be entered into their job application. The relevance score is high if the work experiences, educational programs, and projects they have participated in have a semantic match with the job description of what they are applying for. Conversely, the relevance score is low if their work experiences, educational programs, and projects do not match the description of the job they are applying for.

The techniques disclosed here can be used for generating persuasive statements for other applications, for example, for resolving family issues such as divorce.

The techniques disclosed here can be used for other applications involving the generation of persuasive statements based on a set of input facts. The exploration phase will explore the input facts for relevant information and build the weighted epoch tree 250 and the synthetic statement generation module 150 will traverse the weighted epoch tree 250 to accumulate information and generate the synthetic statement 145.

The framework can be used for distinct applications while maintaining the same code by providing a function for computing the relevance scores 720 specific to the application. This results in minimizing the code for different applications.

Training of Machine Learning-Based Language Model

According to an embodiment, the online system 130 retrains the machine learning-based language model based on training data collected by the online system 130. The training data may be collected based on candidate 110 profiles and corresponding statements. The statements may be provided by experts or generated by the synthetic statement generation module 150 and approved by an expert. The retraining may be performed periodically when sufficient amounts of training data have accumulated. Retraining is referring to the adjustment of parameters in the machine learning-based language model to minimize a loss function based on the output of the machine learning-based language model.

In another embodiment, the synthetic user profile generation module 170 generates synthetic user profiles 175 with details about a candidate 110 that do not perpetuate stereotypes. The synthetic user profile generation module 170 chooses parameters and then generates unique synthetic user profiles 175 by changing one parameter before each generation. The synthetic user profile generation module 170 will choose control parameters such as gender, race, nationality, sexual orientation, background, and name. For example, the synthetic user profile generation module 170 keeps all parameters constant and then generates new synthetic user profiles 175 with the ethnicities varying each generation until all ethnicities are used. The. The synthetic user profiles are then used to retrain a machine learning-based language model 150 to mitigate bias through recalculations of the parameters within the machine learning-based language model.

In another embodiment, the synthetic statement generation module 150 generates synthetic statements 145 used to mitigate bias within machine learning-based language models. The synthetic statement generation module 150 generates synthetic statements containing information to challenge stereotypes that will be used to adjust certain parameters of the machine learning-based language model 150 during training.

Computer Architecture

Figure 11:
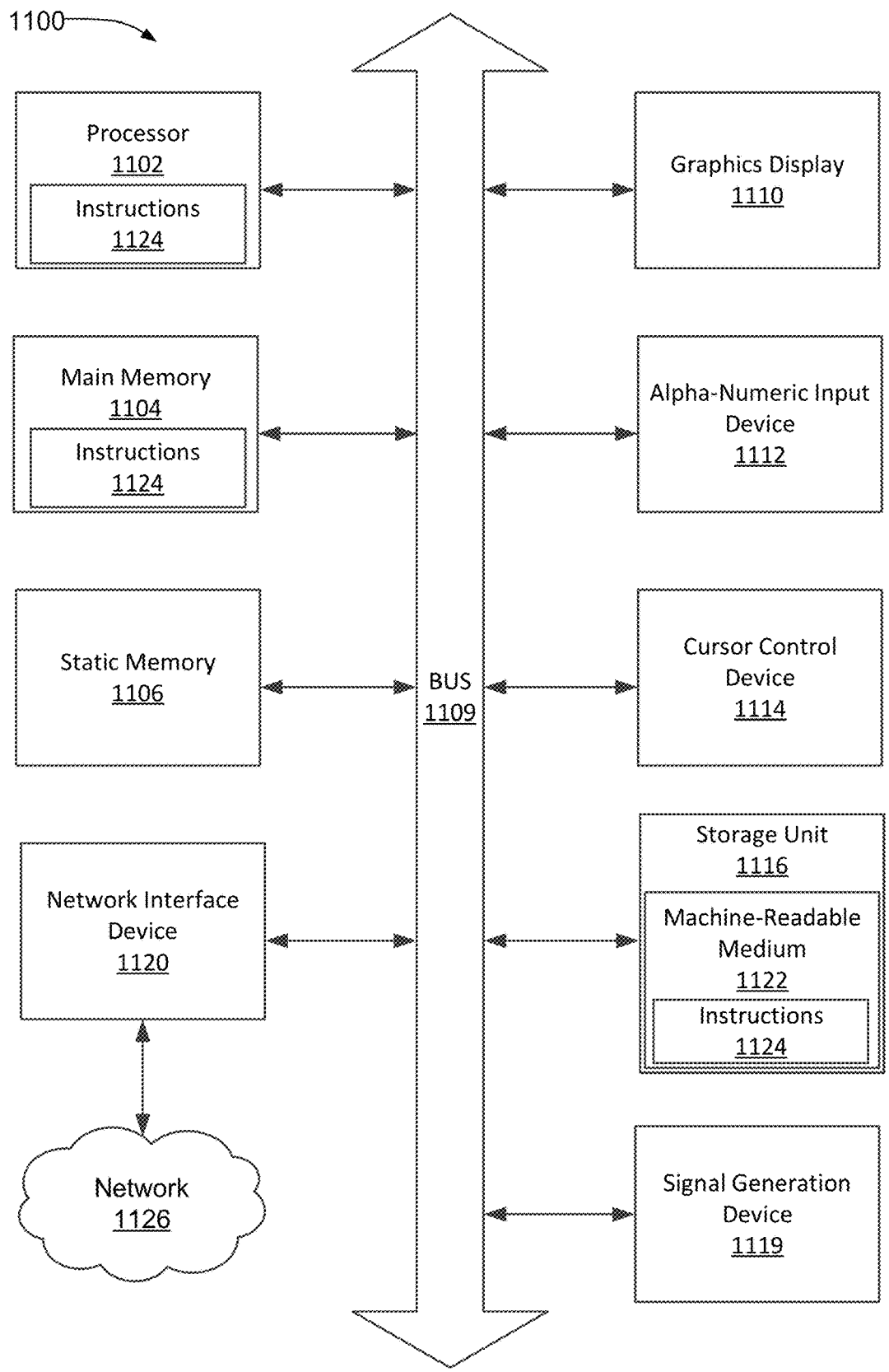
FIG. 11 illustrates an example machine to read and execute computer readable instructions, in accordance with an embodiment.

Turning now to FIG. 11, illustrated is an example machine to read and execute computer readable instructions, in accordance with an embodiment. The computer system 1100 can be used to execute instructions 1124 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 1124 (sequential or otherwise) that specify actions to be taken by that machine. Further, while only a single machine is illustrated, the term "machine" shall also be taken to include any collection of machines that individually or jointly execute instructions 1124 to perform any one or more of the methodologies discussed herein.

The example computer system 1100 includes one or more processing units (generally processor 1102). The processor 1102 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor executes an operating system for the computing system 1100. The computer system 1100 also includes a main memory 1104. The computer system may include a storage unit 1116. The processor 1102, memory 1104, and the storage unit 1116 communicate via a bus 1108.

In addition, the computer system 1100 can include a static memory 1106, a graphics display 1110 (e.g., to drive a plasma display panel (PDP), a liquid crystal display (LCD), or a projector). The computer system 1100 may also include alphanumeric input device 1112 (e.g., a keyboard), a cursor control device 1114 (e.g., a mouse, a trackball, a joystick, a motion sensor, or other pointing instrument), a signal generation device 1118 (e.g., a speaker), and a network interface device 1120, which also are configured to communicate via the bus 1108.

The storage unit 1116 includes a machine-readable medium 1122 on which is stored instructions 1124 (e.g., software) embodying any one or more of the methodologies or functions described herein. The instructions 1124 may also reside, completely or at least partially, within the main memory 1104 or within the processor 1102 (e.g., within a processor's cache memory) during execution thereof by the computer system 1100, the main memory 1104 and the processor 1102 also constituting machine-readable media. The instructions 1124 may be transmitted or received over a network 1126, via the network interface device 1120.

While machine-readable medium 1122 is shown in an example embodiment to be a single medium, the term "machine-readable medium" should be taken to include a single medium or multiple media (e.g., a centralized or distributed database, or associated caches and servers) able to store the instructions 1124. The term "machine-readable medium" shall also be taken to include any medium that is capable of storing instructions 1124 for execution by the machine and that cause the machine to perform any one or more of the methodologies disclosed herein. The term "machine-readable medium" includes, but not be limited to, data repositories in the form of solid-state memories, optical media, and magnetic media.

ADDITIONAL CONSIDERATIONS

The foregoing description of the embodiments has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A computer-implemented method, comprising:
    determining a total time interval associated with a user for exploration of information describing the user;
    creating a root epoch node for building a weighted epoch tree comprising epoch nodes, each epoch node associated with a time interval associated with the user, wherein an epoch node has a relevance score determined based on a set of events associated with the user that occurred during the time interval of the epoch node;
    building the weighted epoch tree based on information describing the user, comprising:
        selecting an epoch node of the weighted epoch tree for further exploration based on relevance scores of epoch nodes of the weighted epoch tree,
        determining a natural language question relevant to a context represented by the selected epoch node,
        determining a natural language answer to the natural language question,
        determining whether to create child epoch nodes for the selected epoch node based on the natural language answer using a machine learning-based language model, and
        responsive to determining to create child epoch nodes, dividing the time interval of the epoch node into sub-intervals based on the natural language answer and creating a child epoch node for each sub-interval; and
    traversing the weighted epoch tree for generating a synthetic statement for the user.

2. The computer-implemented method of claim 1, wherein determining a natural language question relevant to the context represented by the selected epoch node comprises:
    storing, in a vector database, a set of natural language questions;
    generating a natural language description of the context represented by the selected epoch node; and
    selecting from the vector database, one or more natural language questions based on a vector distance between a vector representation of the natural language description of the context and vector representations of natural language questions stored in the vector database.

3. The computer-implemented method of claim 1, wherein determining whether to create child epoch nodes for the selected epoch node based on the natural language answer comprises:
generating a prompt for a machine learning-based language model, the prompt specifying the natural language answer and requesting the machine learning-based language model to determine whether the natural language answer comprises a plurality of epochs;
sending the prompt for execution to the machine learning-based language model;
receiving a response based on the execution of the machine learning-based language model; and
responsive to the response indicating that there are multiple epochs within the time interval represented by the selected epoch node, determining to create child epoch nodes for the selected epoch node.

4. The computer-implemented method of claim 1, wherein selecting an epoch node of the weighted epoch tree for further exploration based on relevance scores of epoch nodes of the weighted epoch tree comprises:
traversing the weighted epoch tree to identify a leaf epoch node having a highest relevance score compared to other leaf epoch nodes of the weighted epoch tree; and
providing the identified epoch node as the selected epoch node.

5. The computer-implemented method of claim 1, wherein determining the natural language answer to the natural language question comprises:
sending the natural language question for display via a client device; and
receiving, via the client device, the natural language answer to the natural language question.

6. The computer-implemented method of claim 1, wherein building the weighted epoch tree further comprises:
responsive to determining not to create child epoch nodes, generating one or more natural language questions for extracting events associated with the user within the time interval of the epoch node; and
adding information to the epoch node based on natural language answers corresponding to the one or more natural language questions.

7. The computer-implemented method of claim 1, further comprising, for a particular epoch node of the weighted epoch tree:
storing an attribute representing user provided information as received from the user; and
generating a summary of the user provided information, comprising:
generating a prompt for the machine learning-based language model, the prompt specifying the user provided information and requesting the machine learning-based language model to generate a summary having less than a threshold size;
sending the prompt for execution to the machine learning-based language model; and
extracting the summary for the epoch node from a response received by executing the machine learning-based language model.

8. The computer-implemented method of claim 1, further comprising, for a particular epoch node of the weighted epoch tree having a plurality of child epoch nodes, generating a summary of a user provided description, comprising:
generating a prompt for the machine learning-based language model, the prompt specifying the summary of each of the child epoch nodes and requesting the machine learning-based language model to generate a summary having less than a threshold size;
sending the prompt for execution to the machine learning-based language model; and
extracting the summary for the epoch node from a response received by executing the machine learning-based language model.

9. A non-transitory computer readable storage medium, storing instructions that when executed by one or more computer processors cause the one or more computer processors to perform steps comprising:
determining a total time interval associated with a user for exploration of information describing the user;
creating a root epoch node for building a weighted epoch tree comprising epoch nodes, each epoch node associated with a time interval associated with the user, wherein an epoch node has a relevance score determined based on a set of events associated with the user that occurred during the time interval of the epoch node;
building the weighted epoch tree based on information describing the user, comprising:
selecting an epoch node of the weighted epoch tree for further exploration based on relevance scores of epoch nodes of the weighted epoch tree,
determining a natural language question relevant to a context represented by the selected epoch node,
determining a natural language answer to the natural language question,
determining whether to create child epoch nodes for the selected epoch node based on the natural language answer using a machine learning-based language model, and
responsive to determining to create child epoch nodes, dividing the time interval of the epoch node into sub-intervals based on the natural language answer and creating a child epoch node for each sub-interval; and
traversing the weighted epoch tree for generating a synthetic statement for the user.

10. The non-transitory computer readable storage medium of claim 9, wherein determining a natural language question relevant to the context represented by the selected epoch node comprises:
storing, in a vector database, a set of natural language questions;
generating a natural language description of the context represented by the selected epoch node; and
selecting from the vector database, one or more natural language questions based on a vector distance between a vector representation of the natural language description of the context and vector representations of natural language questions stored in the vector database.

11. The non-transitory computer readable storage medium of claim 9, wherein determining whether to create child epoch nodes for the selected epoch node based on the natural language answer comprises:
generating a prompt for a machine learning-based language model, the prompt specifying the natural language answer and requesting the machine learning-based language model to determine whether the natural language answer comprises a plurality of epochs;
sending the prompt for execution to the machine learning-based language model;

receiving a response based on the execution of the machine learning-based language model; and responsive to the response indicating that there are multiple epochs within the time interval represented by the selected epoch node, determining to create child epoch nodes for the selected epoch node.

12. The non-transitory computer readable storage medium of claim 9, wherein selecting an epoch node of the weighted epoch tree for further exploration based on relevance scores of epoch nodes of the weighted epoch tree comprises:

traversing the weighted epoch tree to identify a leaf epoch node having a highest relevance score compared to other leaf epoch nodes of the weighted epoch tree; and providing the identified epoch node as the selected epoch node.

13. The non-transitory computer readable storage medium of claim 9, wherein determining the natural language answer to the natural language question comprises:

sending the natural language question for display via a client device; and receiving, via the client device, the natural language answer to the natural language question.

14. The non-transitory computer readable storage medium of claim 9, wherein building the weighted epoch tree further comprises:

responsive to determining not to create child epoch nodes, generating one or more natural language questions for extracting events associated with the user within the time interval of the epoch node; and adding information to the epoch node based on natural language answers corresponding to the one or more natural language questions.

15. The non-transitory computer readable storage medium of claim 9, wherein the instructions further cause the one or more computer processors to perform steps comprising, for a particular epoch node of the weighted epoch tree:

storing an attribute representing user provided information as received from the user; and generating a summary of the user provided information, comprising:

generating a prompt for the machine learning-based language model, the prompt specifying the user provided information and requesting the machine learning-based language model to generate a summary having less than a threshold size;

sending the prompt for execution to the machine learning-based language model; and extracting the summary for the epoch node from a response received by executing the machine learning-based language model.

16. The non-transitory computer readable storage medium of claim 9, wherein the instructions further cause the one or more computer processors to perform steps comprising, for a particular epoch node of the weighted epoch tree having a plurality of child epoch nodes, generating a summary of a user provided description, comprising:

generating a prompt for the machine learning-based language model, the prompt specifying the summary of each of the child epoch nodes and requesting the machine learning-based language model to generate a summary having less than a threshold size;

sending the prompt for execution to the machine learning-based language model; and extracting the summary for the epoch node from a response received by executing the machine learning-based language model.

17. A computer system comprising:
one or more computer processors; and
a non-transitory computer readable storage medium, storing instructions that when executed by the one or more computer processors cause the one or more computer processors to perform steps comprising:

determining a total time interval associated with a user for exploration of information describing the user;

creating a root epoch node for building a weighted epoch tree comprising epoch nodes, each epoch node associated with a time interval associated with the user, wherein an epoch node has a relevance score determined based on a set of events associated with the user that occurred during the time interval of the epoch node;

building the weighted epoch tree based on information describing the user, comprising:

selecting an epoch node of the weighted epoch tree for further exploration based on relevance scores of epoch nodes of the weighted epoch tree, determining a natural language question relevant to a context represented by the selected epoch node, determining a natural language answer to the natural language question, determining whether to create child epoch nodes for the selected epoch node based on the natural language answer using a machine learning-based language model, and responsive to determining to create child epoch nodes, dividing the time interval of the epoch node into sub-intervals based on the natural language answer and creating a child epoch node for each sub-interval; and traversing the weighted epoch tree for generating a synthetic statement for the user.

18. The computer system of claim 17, wherein determining a natural language question relevant to the context represented by the selected epoch node comprises:

storing, in a vector database, a set of natural language questions;

generating a natural language description of the context represented by the selected epoch node; and selecting from the vector database, one or more natural language questions based on a vector distance between a vector representation of the natural language description of the context and vector representations of natural language questions stored in the vector database.

19. The computer system of claim 17, wherein determining whether to create child epoch nodes for the selected epoch node based on the natural language answer comprises:

generating a prompt for a machine learning-based language model, the prompt specifying the natural language answer and requesting the machine learning-based language model to determine whether the natural language answer comprises a plurality of epochs;

sending the prompt for execution to the machine learning-based language model;

receiving a response based on the execution of the machine learning-based language model; and responsive to the response indicating that there are multiple epochs within the time interval represented by the selected epoch node, determining to create child epoch nodes for the selected epoch node.

20. The computer system of claim 17, wherein the instructions further cause the one or more computer processors to perform steps comprising, for a particular epoch node of the weighted epoch tree having a plurality of child epoch nodes, generating a summary of a user provided description, comprising:

generating a prompt for the machine learning-based language model, the prompt specifying the summary of each of the child epoch nodes and requesting the machine learning-based language model to generate a summary having less than a threshold size;

sending the prompt for execution to the machine learning-based language model; and extracting the summary for the epoch node from a response received by executing the machine learning-based language model.

* * * * *